US012761422B2

(12) United States Patent
Minegishi et al.

(10) Patent No.: US 12,761,422 B2
(45) Date of Patent: Oct. 13, 2026

(54) ROTARY JOINT AND OPTICAL MEASUREMENT DEVICE USING THE SAME

(71) Applicant: Otsuka Electronics Co., Ltd., Osaka (JP)

(72) Inventors: Masayoshi Minegishi, Hirakata (JP); Shiro Kawaguchi, Hirakata (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 319 days.

(21) Appl. No.: 18/695,365

(22) PCT Filed: Aug. 1, 2022

(86) PCT No.: PCT/JP2022/029445
§ 371 (c)(1),
(2) Date: Mar. 26, 2024

(87) PCT Pub. No.: WO2023/053708
PCT Pub. Date: Apr. 6, 2023

(65) Prior Publication Data

US 2024/0393541 A1 Nov. 28, 2024

(30) Foreign Application Priority Data

Oct. 1, 2021 (JP) ................................ 2021-162667

(51) Int. Cl.
*G02B 6/36* (2006.01)
*G02B 6/40* (2006.01)

(52) U.S. Cl.
CPC ............ *G02B 6/3604* (2013.01); *G02B 6/40* (2013.01)

(58) Field of Classification Search
CPC ................................ G02B 6/3604; G02B 6/40
See application file for complete search history.

(56) References Cited

U.S. PATENT DOCUMENTS 4,027,945 A * 6/1977 Iverson ................. H04B 10/25 385/115
4,900,117 A * 2/1990 Chen ................... G02B 6/2817 250/227.24

(Continued)

FOREIGN PATENT DOCUMENTS

CN 102576131 B 9/2015
EP 1134600 A1 9/2001

(Continued)

OTHER PUBLICATIONS

English translation of WO2020/027297A1 (Year: 2020).*

(Continued)

*Primary Examiner* — Sung H Pak
(74) *Attorney, Agent, or Firm* — HEA Law PLLC

(57) ABSTRACT

Provided is a rotary joint including a body-side fiber holding portion in which one end of the faces of light reception fibers are disposed in a first circular area and one end of the faces of light projection fibers are disposed in a first annular area outside of the first circular area, a probe-side fiber holding portion in which one end of the faces of light reception fibers are disposed in a second circular area and a light projection fiber is disposed in a second annular area outside of the second circular area, a rotation support portion that relatively and rotatably supports the body-side fiber holding portion and the probe-side fiber holding portion, and a light separating tube that is provided between the body-side fiber holding portion and the probe-side fiber holding portion.

5 Claims, 9 Drawing Sheets

(56) References Cited

U.S. PATENT DOCUMENTS

| | | | |
|---|---|---|---|
| 2012/0213473 | A1 | 8/2012 | Sasho et al. |
| 2019/0391338 | A1 | 12/2019 | Tearney et al. |

FOREIGN PATENT DOCUMENTS

| | | | | | |
|---|---|---|---|---|---|
| JP | S63-108312 | A | 5/1988 | | |
| JP | 2013-244291 | A | 12/2013 | | |
| JP | 2020-506425 | A | 2/2020 | | |
| WO | WO-2020027297 | A1 * | 2/2020 | ............... | G02B 6/26 |

OTHER PUBLICATIONS

International Search Report of Sep. 20, 2022 for International Application No. PCT/JP2022/029445, pp. 1-4.
Search Report of Sep. 22, 2025, for corresponding EP Patent Application No. 22875585.6, pp. 1-10.
Office Action of Feb. 12, 2026, for corresponding TW Patent Application No. 111130173, pp. 1-7.

* cited by examiner

ROTARY JOINT AND OPTICAL MEASUREMENT DEVICE USING THE SAME

CROSS REFERENCE TO RELATED APPLICATIONS

This application is a National Stage of International Application No. PCT/JP2022/029445 filed on Aug. 1, 2022, which claims priority from Japanese Patent Application 2021-162667, filed on Oct. 1, 2021. The contents of the above document are incorporated herein by reference in its entirety.

TECHNICAL FIELD

The present invention relates to a rotary joint and an optical measurement device using the same, and more particularly to a rotary joint connecting with an optical cable having a multi-channel configuration.

BACKGROUND ART

An optical measurement device in which a probe and a main body are connected by an optical cable may include a rotation mechanism called a rotary joint in the middle of the cable. The rotary joint holds the front end of the optical cable on the main body side while holding the proximal end of the optical cable on the probe side such that the ends are opposed to each other and rotatable coaxially.

In a case where an optical fiber is used both as an optical channel for projecting light and an optical channel for receiving light, if a rotary joint is provided in the middle of the optical fiber, optical crosstalk may occur in which the light from the light projection portion of the main body returns to the light receiving device of the main body without reaching a sample due to internal reflection in the rotary joint. Such crosstalk leads to a decrease in the accuracy of the optical measurement.

SUMMARY OF INVENTION

Technical Problem

A multi-channel configuration, in which different optical fiber bundles are used separately for the optical channel for light projection and the optical channel for light reception, is conceivable for preventing such crosstalk. For example, it is conceivable that an optical fiber group for light projection and an optical fiber group for light reception are arranged coaxially and spaced apart from each other in the radial direction to form an optical cable, and a rotary joint is provided in the middle of the optical cable. However, such a configuration may cause a so-called pulsating phenomenon as the rotary joint relatively rotates the fiber bundles about the axis. This is because an area of an end of the face of each fiber provided on one side of the rotary joint that overlaps an end of the face of each fiber provided on the other side changes with the rotation of the rotary joint.

The present invention has been made in view of the above problem, and an object thereof is to provide a rotary joint for an optical fiber and an optical measurement device using the same capable of inhibiting optical crosstalk between a light projection channel and a light reception channel and inhibiting pulsation of light during a rotational operation.

Solution to Problem

In order to solve the above problem, a rotary joint according to the present invention includes a first fiber holding portion that holds a plurality of optical fibers included in a first optical cable such that a first end face of a first inner optical fiber included in the first optical cable is disposed in a first circular area and a second end face of a group of first outer optical fibers included in the first optical cable is disposed in a first annular area that is concentric with the first circular area and has an inner diameter larger than a diameter of the first circular area, a second fiber holding portion that holds a plurality of optical fibers included in a second optical cable such that a first end face of a second inner optical fiber included in the second optical cable is disposed in a second circular area and a second end face of a group of second outer optical fibers included in a second annular area that is concentric with the second circular area and has an inner diameter larger than a diameter of the second circular area, a rotation support portion that relatively and rotatably supports the first fiber holding portion and the second fiber holding portion such that the first circular area and the second circular area are separated from and opposed to each other and the first annular area and the second annular area are separated from and opposed to each other, and a light separating portion that is provided between the first fiber holding portion and the second fiber holding portion and inhibits passage of light between a columnar space and a cylindrical space, the columnar space being provided between the first circular area and the second circular area, the cylindrical space being provided between the first annular area and the second annular area.

The first circular area and the second circular area may be coaxially disposed, and the first annular area and the second annular area may be coaxially disposed.

The light separating portion may include a first tube member disposed between the columnar space and the cylindrical space.

An inner surface of the first tube member may be formed into a mirror surface. An outer surface of the first tube member may be formed into a mirror surface.

The light separating portion may include a second tube member that surrounds the cylindrical space and has an inner surface that is formed into a mirror surface. Alternatively, the light separating portion may include a translucent columnar member disposed in the columnar space and a translucent cylindrical member disposed in the cylindrical space, where the columnar member is inserted into the cylindrical space.

An optical measurement device according to the present invention includes the rotary joint.

DESCRIPTION OF EMBODIMENTS

Embodiments of the present disclosure will be described below with reference to the drawings.

Figure 1:
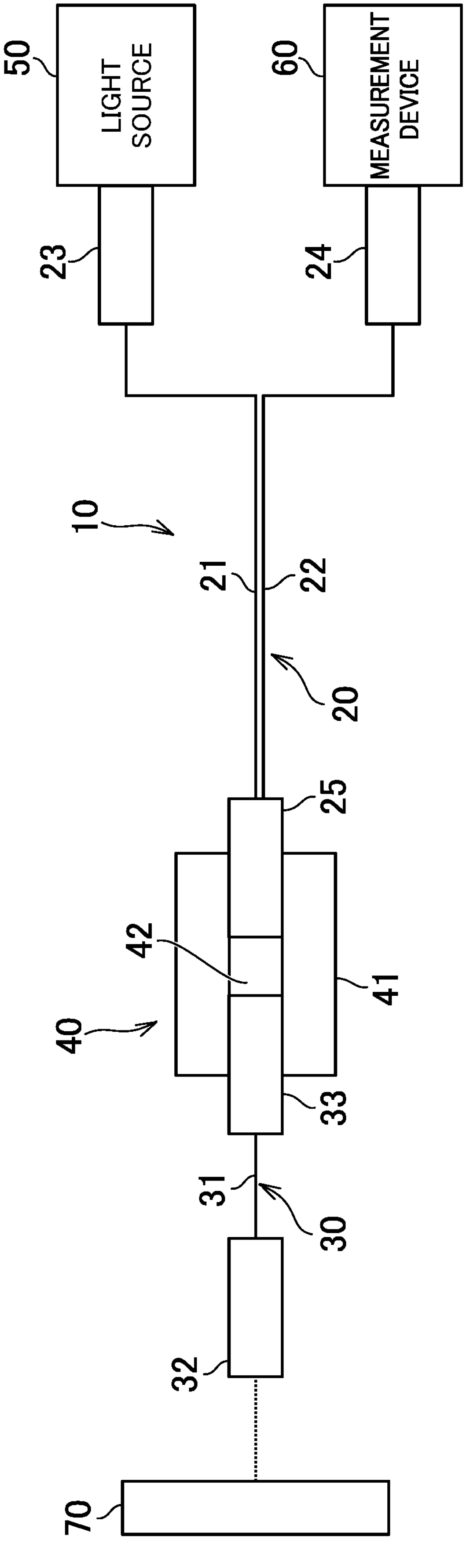
FIG. 1 is a configuration diagram of an optical measurement device according to an embodiment of the present invention.

FIG. 1 is a configuration diagram of an optical measurement device according to an embodiment of the present invention. In an optical measurement device 10 shown in FIG. 1, light emitted from a light source 50 is irradiated from a probe 32 to a sample 70, and the reflected light is received by the probe 32 and guided to a measurement device 60. In this manner, the measurement device 60 calculates various types of information of the sample 70. For example, the optical measurement device 10 may irradiate the sample 70 with white light emitted from the light source 50, and measure a film thickness of the surface of the sample 70 from the spectrum of the reflected light. In this case, the measurement device 60 includes a spectroscope for obtaining spectral data of the reflected light and a computer for calculating the film thickness from the spectral data.

The optical measurement device 10 includes a probe-side optical cable 30 including a light projection and reception optical cable 31. The light projection and reception optical cable 31 is a two-channel optical fiber bundle for projecting and receiving light, and a probe 32 for irradiating the sample 70 with light and receiving the reflected light is provided at a front end thereof. Further, a probe-side fiber holding portion 33 constituting the rotary joint 40 is provided at the proximal end of the light projection and reception optical cable 31.

The optical measurement device 10 also includes a body-side optical cable 20, which is a two-branch fiber bundle. That is, the body-side optical cable 20 includes a projection optical cable 21, which is an optical fiber bundle for projecting light, and a reception optical cable 22, which is an optical fiber bundle for receiving light. A connector 23 is provided at the proximal end of the projection optical cable 21 and is connected to the light source 50. A connector 24 is provided at the proximal end of the reception optical cable 22 and is connected to the measurement device 60. The ends of the projection optical cable 21 and the reception optical cable 22 are integrally held by a body-side fiber holding portion 25 constituting the rotary joint 40.

The rotary joint 40 includes the body-side fiber holding portion 25, the probe-side fiber holding portion 33, a light separating tube 42, which is a light separating portion (optical member), and a rotation support portion 41. The rotation support portion 41 is a substantially cylindrical member, and a front end of the substantially cylindrical body-side fiber holding portion 25 is inserted into the opening of the rotation support portion 41 on the body side. The front end of the body-side fiber holding portion 25 is fixed to the rotation support portion 41 with a bolt (not shown), for example, and the rotation support portion 41 supports the front end of the body-side fiber holding portion 25 while its rotation is stopped. The proximal end of the substantially cylindrical probe-side fiber holding portion 33 is inserted into the opening of the rotation support portion 41 on the probe side. The proximal end of the probe-side fiber holding portion 33 is rotatably supported by the rotation support portion 41 via a bearing (not shown).

In the rotation support portion 41, the probe-side fiber holding portion 33 and the body-side fiber holding portion 25 are arranged coaxially, and the proximal end face of the probe-side fiber holding portion 33 and the front end face of the body-side fiber holding portion 25 are separated and opposed to each other. A substantially cylindrical light separating tube 42 is disposed between the proximal end face of the probe-side fiber holding portion 33 and the front end face of the body-side fiber holding portion 25. The light separating tube 42, which will be described in detail later, has a function of allowing light to pass between the probe-side fiber holding portion 33 and the main-body-side fiber holding portion 25 while preventing crosstalk between the reflected light and the projected light. The light separating tube 42 may be fixed to the rotation support portion 41 or rotatably supported. Desirably, the end of the face of the light separating tube 42 on the body side is in contact with the front end face of the body-side fiber holding portion 25 so as to prevent the reflection at the end of the face of the light separating tube 42 and crosstalk due to the reflection. Further, it is desirable that the probe-side end face of the light separating tube 42 is close to the proximal end face of the probe-side fiber holding portion 33 as long as the rotation of the probe-side fiber holding portion 33 is not inhibited.

Figure 2:
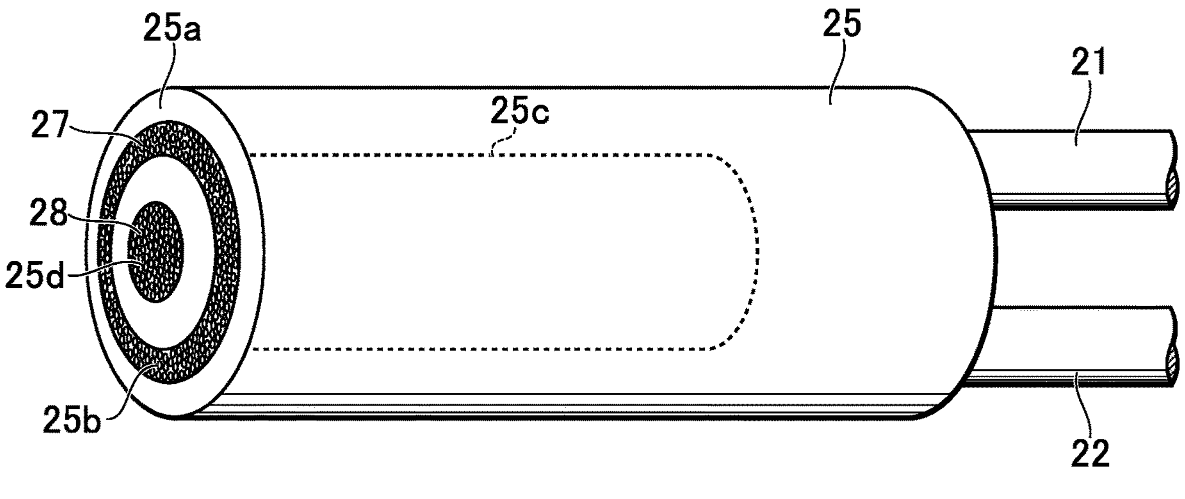
FIG. 2 is a perspective view of a body-side fiber holding portion according to the embodiment of the present invention.

FIG. 2 is a perspective view of the body-side fiber holding portion 25. The body-side fiber holding portion 25 has a substantially cylindrical outer tube, and accommodates therein a lot of light projection fibers 27, a lot of light reception fibers 28, and a separation band 25*c*. Specifically, the light-shielding and cylindrical separation band 25*c* is coaxially disposed inside the body-side fiber holding portion 25, and the light reception fibers 28 are disposed inside the separation band 25*c*. Further, the light projection fibers 27 are disposed between the outer surface of the separation band 25*c* and the inner surface of the body-side fiber holding portion 25. That is, when the body-side fiber holding portion 25 is viewed from the front, the end of the faces of a lot of light reception fibers 28 are disposed in a circular area 25*d*, which is an opening of the separation band 25*c*. The end of the faces of the light reception fibers 28 may be randomly disposed in the circular area 25*d*. An annular area 25*b* is provided between the end of the face of the separation band 25*c* and a body end face 25*a* of the cylindrical body-side fiber holding portion 25, and the end of the faces of a lot of light projection fibers 27 are disposed in the annular area 25*b*. The end of the faces of the light projection fibers 27 may also be randomly disposed in the annular area 25*b*. The annular area 25*b* is concentric with the circular area 25*d* and has an inner diameter larger than the diameter of the circular area 25*d*. The annular area 25*b* has an outer diameter smaller than the inner diameter of the body-side fiber holding portion 25. The end of the faces of the light projection fibers 27, the end of the faces of the light reception fiber 28, the end of the face of the separation band 25*c*, and the body end face 25*a* are flush with each other. The light reception fibers 28 having end of the faces disposed in the circular area 25*d* are bundled as the reception optical cable 22. The light projection fibers 27 having the end of the faces disposed in the annular area 25*b* are bundled as the projection optical cable 21.

Figure 3:
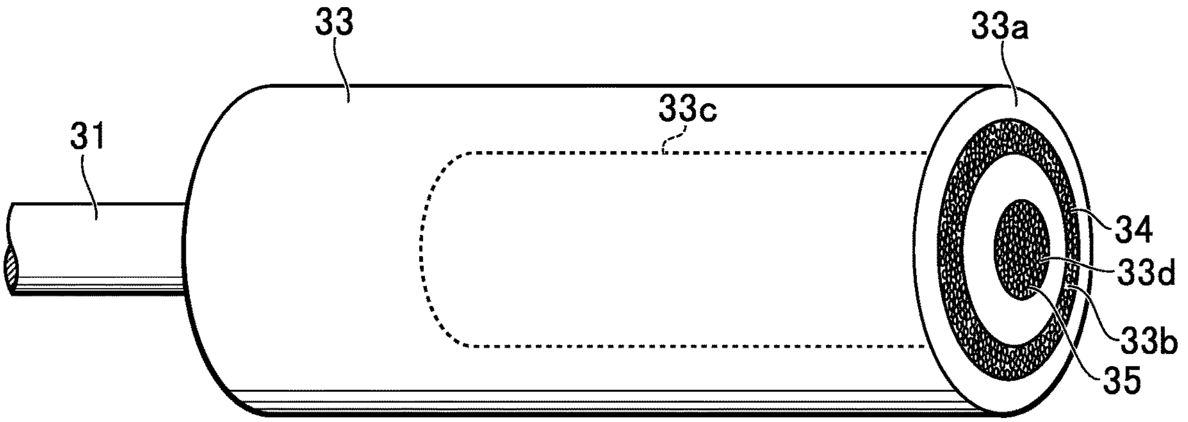
FIG. 3 is a perspective view of a probe-side fiber holding portion according to the embodiment of the present invention.

FIG. 3 is a perspective view of the probe-side fiber holding portion 33. The probe-side fiber holding portion 33 also a substantially has cylindrical tube, outer and accommodates therein a lot of light projection fibers 34, a lot of light reception fibers 35, and a separation band 33*c*. Specifically, the light-shielding and cylindrical separation band 33*c* is coaxially disposed inside the probe-side fiber holding portion 33, and the light reception fibers 35 are disposed inside the separation band 33*c*. Further, the light projection fibers 34 are disposed between the outer surface of the separation band 33*c* and the inner surface of the probe-side fiber holding portion 33. That is, when the probe-side fiber holding portion 33 is viewed from the front, the end of the faces of a lot of light reception fibers 34 are disposed in a circular area 33*d*, which is an opening of the separation band 33*c*. An annular area 33*b* is provided between the end of the face of the separation band 33*c* and a body end face 33*a* of the cylindrical probe-side fiber holding portion 33, and the end of the faces of a lot of light projection fibers 34 are disposed in the annular area 33*b*. The annular area 33*b* is concentric with the circular area 33*d* and has an inner diameter larger than the diameter of the circular area 33*d*. The annular area 33*b* has an outer diameter smaller than the inner diameter of the probe-side fiber holding portion 33. The end of the faces of the light projection fibers 34, the end of the faces of the light reception fiber 35, the end of the face of the separation band 33*c*, and the body end face 33*a* are flush with each other. The light reception fibers 35 having end of the faces disposed in the circular area 33*d* and the light projection fibers 34 having end of the faces disposed in the annular area 33*b* are bundled as the light projection and reception optical cable 31.

Figure 4:
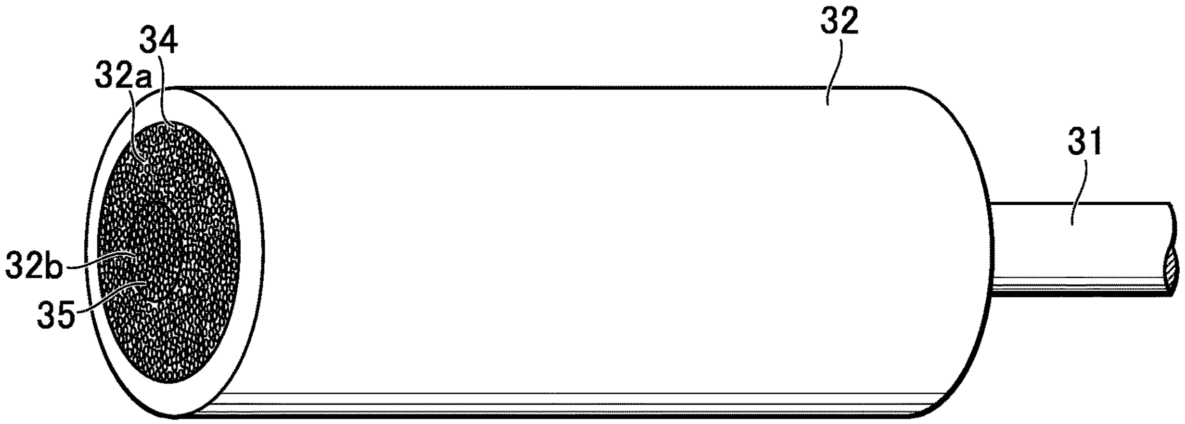
FIG. 4 is a perspective view showing the probing for embodiment of the present invention.

FIG. 4 is a perspective view of the probe 32. The probe 32 has a substantially cylindrical outer tube and accommodates the ends of the light projection fibers 34 and the light reception fibers 35 therein. That is, when the probe 32 is viewed from the front, the end of the faces of the light reception fibers 35 are disposed in the circular area 32*b* located at the center, and the end of the faces of the light projection fibers 34 are disposed in the annular area 32*a* in the outside. The light reception fibers 35 may be randomly disposed in the circular area 32*b*. Further, the light projection fibers 34 may also be randomly disposed in the annular area 32*a*.

Figure 5:
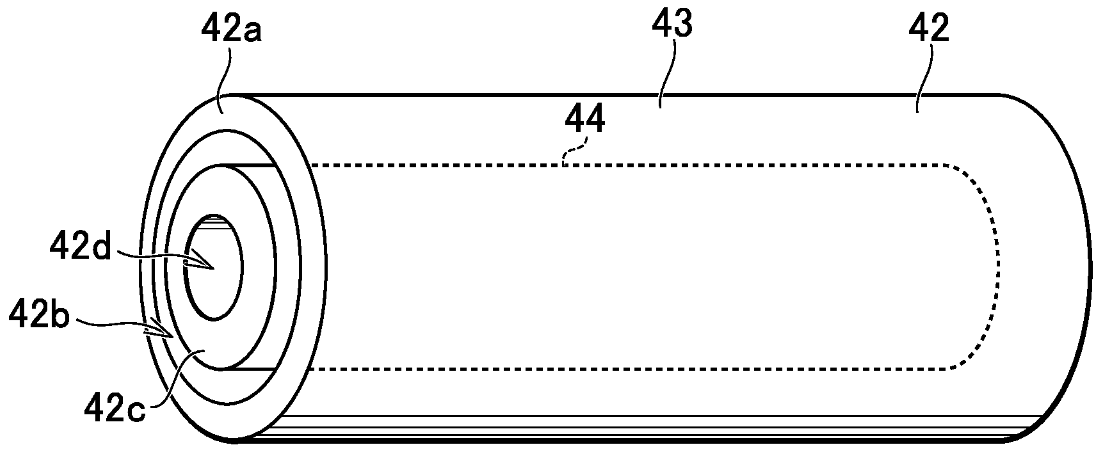
FIG. 5 is a perspective view of a light separating tube according to the embodiment of the present invention.

FIG. 5 is a perspective view of the light separating tube 42. The light separating tube 42 includes a cylindrical outer tube 43 made of metal or resin, and a cylindrical inner tube 44 also made of metal or resin and having an outer diameter smaller than the inner diameter of the outer tube, for example. The inner tube 44 is coaxially disposed inside the outer tube 43. The outer tube 43 and the inner tube 44 are fixed to the body-side fiber holding portion 25 or the probe-side fiber holding portion 33, and remain coaxially arranged. For example, the outer tube 43 may be fixed to the body end face 25*a* of the body-side fiber holding portion 25. Alternatively, the outer tube 43 may be integrally formed with the outer tube of the body-side fiber holding portion 25. The inner tube 44 may be fixed to the separation band 25*c* of the body-side fiber holding portion 25. Alternatively, the inner tube 44 may be integrally formed with the separation band 25*c*. In this manner, the projection light propagates through a space 42*b* between the inner surface of the outer tube 43 and the outer surface of the inner tube 44, and the reflected light propagates through an inner space 42*d* of the inner tube 44.

In a case where the outer tube 43 is made of metal, the inner surface thereof may be finished into a mirror surface. This serves to inhibit light loss in the light separating tube 42. In a case where the outer tube 43 is made of resin, plating may be performed so that the inner surface thereof has a mirror finish. Similarly, if the inner tube 44 is made of metal, one or both of the inner surface and the outer surface thereof may be mirror finished. In a case where the inner tube 44 is made of resin, one or both of the inner surface and the outer surface thereof may be plated to form a mirror surface.

A translucent cylindrical member formed of glass or resin, which is preferably transparent, may be disposed in the space 42*b* between the inner surface of the outer tube 43 and the outer surface of the inner tube 44. Further, a translucent columnar member formed of glass or resin, which is preferably transparent, may be disposed inside the inner tube 44. In this case, the inner tube 44 and the outer tube 43 are formed of a material having a refractive index lower than that of the outer tube 43 and the inner tube 44. This allows the translucent cylindrical member and the translucent columnar member to each function as an optical fiber. That is, the total reflection of light emitted from the light projection fiber 27 is repeatedly propagated inside the translucent cylindrical member, and thus the light can be suitably guided to the light projection fiber 34. Further, the total reflection of light emitted from the light reception fiber 35 is repeatedly propagated inside the translucent columnar member, and thus the light can be suitably guided to the light reception fiber 28. No crosstalk occurs between the projected light and the reflected light.

When the light separating tube 42 is viewed from the front, an end of the face 42*d*, which is the opening of the inner tube 44, of the columnar space is positioned at the center, and an end of the face 42*c* of the inner tube 44 is positioned on the outer side thereof. An end of the face 42*b* of the cylindrical space filled with glass, for example, is positioned on the outer side of the end of the face 42*c*. An end of the face 42*a* of the outer tube 43 is positioned on the outer side of the end of the face 42*b*. The end of the faces 42*a* to 42*d* are flush with each other. Only one end portion of the light separating tube 42 has been described here, although the other end portion has the same configuration and the same arrangement.

Figure 6:
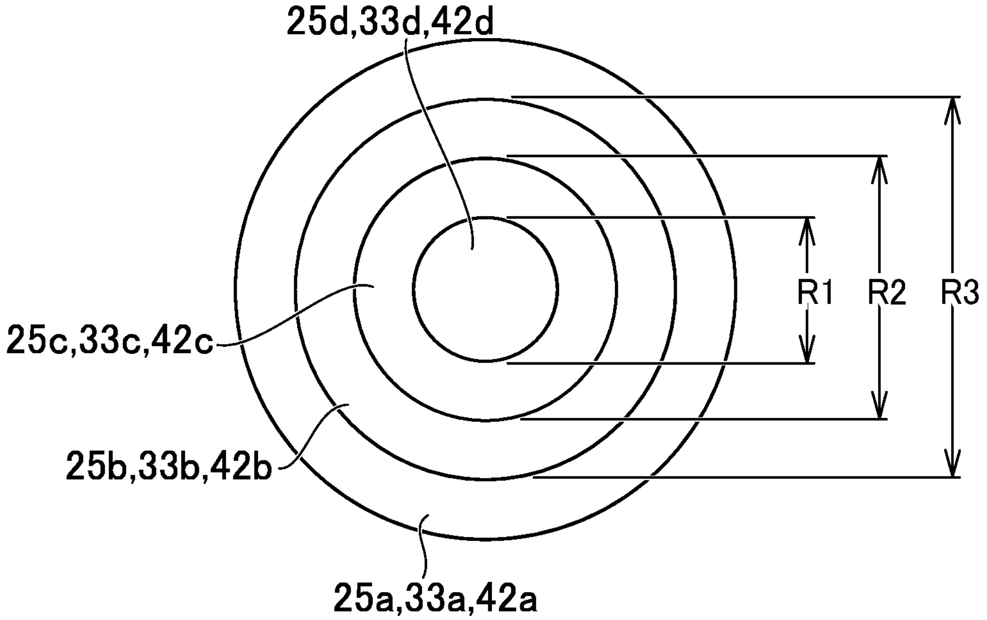
FIG. 6 is a diagram illustrating an arrangement of a body-side fiber holding portion, a probe-side fiber holding portion, and the light separating tube.

In the following, the arrangement of the body-side fiber holding portion 25, the probe-side fiber holding portion 33, and the light separating tube 42 will be described. As shown in FIG. 6, the circular area 25*d* of the body-side fiber holding portion 25, the circular area 33*d* of the probe-side fiber holding portion 33, and the end of the face 42*d*, which is the opening of the inner tube 44, of the columnar space have the same diameter R1, and the circular area 25*d* of the body-side fiber holding portion 25 is disposed adjacent to the end of the face 42*d* of one side of the inner tube 44. Further, the circular area 33*d* of the probe-side fiber holding portion 33 is disposed adjacent to the end of the face 42*d* on the other side. The diameter of the end of the face 42*d* may be slightly larger or smaller than the diameter of the circular areas 25*d* and 33*d*.

The annular area 25*b* of the body-side fiber holding portion 25, the annular area 33*b* of the probe-side fiber holding portion 33, and the end of the face 42*b* of the cylindrical space between the inner tube 44 and the outer tube 43 have the same inner diameter R2 and the same outer diameter R3. The annular area 25*b* of the body-side fiber holding portion 25 is disposed adjacent to the end of the face 42*b* on one end of the inner tube 44. The annular area 33*b* of the probe-side fiber holding portion 33 is disposed adjacent to the end of the face 42*b* on the other end. The inner diameter of the end of the face 42*b* may be slightly larger or smaller than the inner diameter of the annular areas 25*b* and 33*b*. The outer diameter of the end of the face 42*b* may be slightly larger or smaller than the outer diameter of the annular areas 25*b* and 33*b*.

According to the present embodiment, the inner space of the inner tube 44 of the light separating tube 42 is positioned in a columnar space between the circular area 25*d* of the end of the face of the body-side fiber holding portion 25 and the circular area 33*d* of the end of the face of the probe-side fiber holding portion 33, and the columnar space is covered by the inner tube 44. As such, the light between the light projection fibers 27 and 34 is not mixed with the light between the light reception fibers 28 and 35. This can prevent the crosstalk between the light projection channel and the light reception channel. The inner surface of the inner tube 44 is a mirror surface, and thus it is possible to prevent the light loss in the light separating tube 42 in the light reception channel.

Further, the space between the inner tube 44 and the outer tube 43 of the light separating tube 42 is positioned in a cylindrical space between the annular area 25*b* of the end of the face of the body-side fiber holding portion 25 and the annular area 33*b* of the end of the face of the probe-side fiber holding portion 33. The inside of the cylindrical space is shielded by the inner tube 44, and the outer space is shielded by the outer tube 43. At this time, the outer surface of the inner tube 44 and the inner surface of the outer tube 43 are mirror surfaces, and this serves to prevent the light loss in the light separation tube 42 in the light projection channel.

Figure 7:
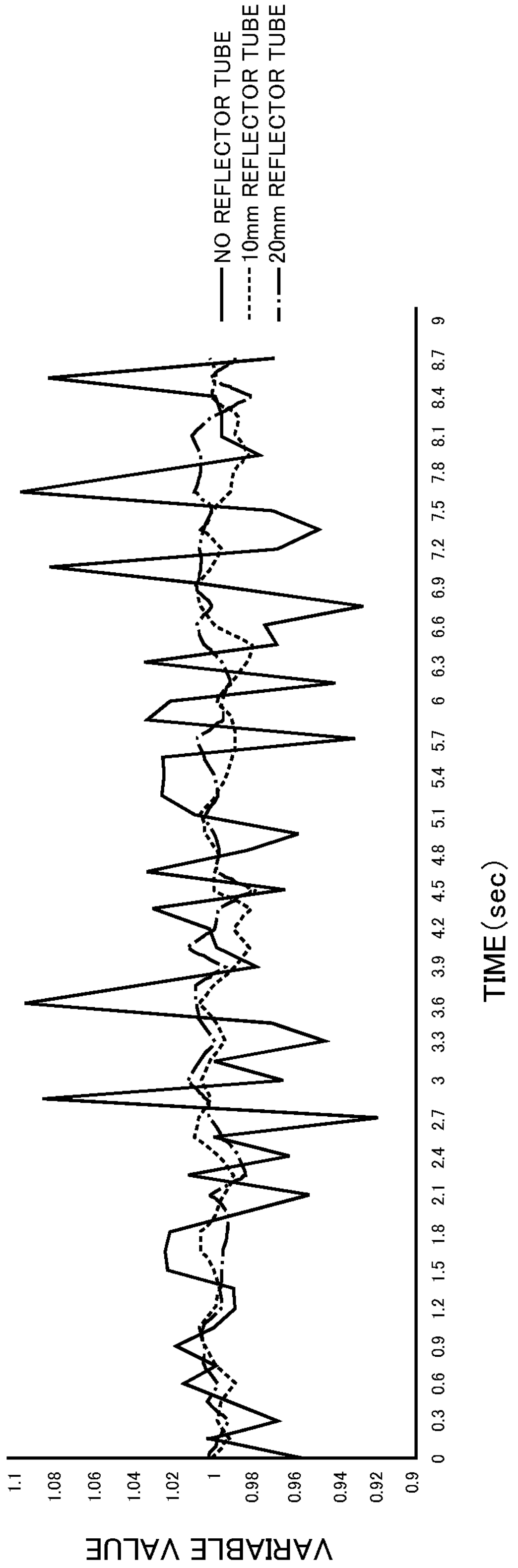
FIG. 7 is a diagram showing a change in light intensity of reflected light from a sample when the rotary joint is rotated.

According to the present embodiment, the circular area 25*d* of the end of the face of the body-side fiber holding portion 25 and the circular area 33*d* of the end of the face of the probe-side fiber holding portion 33 are separated from each other, and thus the exit end of the light reception fiber 35 and the entrance end of the light reception fiber 28 are separated from each other. Further, the annular area 25*b* of the end of the face of the body-side fiber holding portion 25 and the annular area 33*b* of the end of the face of the probe-side fiber holding portion 33 are separated from each other, and thus the exit end of the light projection fiber 27 and the entrance end of the light projection fiber 34 are separated from each other. As such, even if the probe-side fiber holding portion 33 is rotated with respect to the body-side fiber holding portion 25, a pulsation phenomenon hardly occurs in the reflected light. FIG. 7 is a diagram showing a change in light intensity of reflected light from the sample 70 (mirror) when the rotary joint is rotated. In FIG. 7, the horizontal axis represents the elapsed time during the rotation of the probe-side fiber holding portion 33. The vertical axis represents the light intensity at the measurement device 60. The solid line indicates a change in light intensity when the light separating tube 42 is not provided and the body-side fiber holding portion 25 and the probe-side fiber holding portion 33 are disposed adjacent to each other. The broken line indicates a change in light intensity when the light separating tube 42 having the length of 10 mm is used. The dashed-dotted line indicates a change in light intensity when the light separating tube 42 having the length of 20 mm is used. As shown in FIG. 7, when the light separating tube 42 of 10 mm or 20 mm is used, pulsation phenomena of light intensity can be suitably inhibited.

The present invention is not limited to the embodiment described above, and various modifications can be made.

Figure 8:
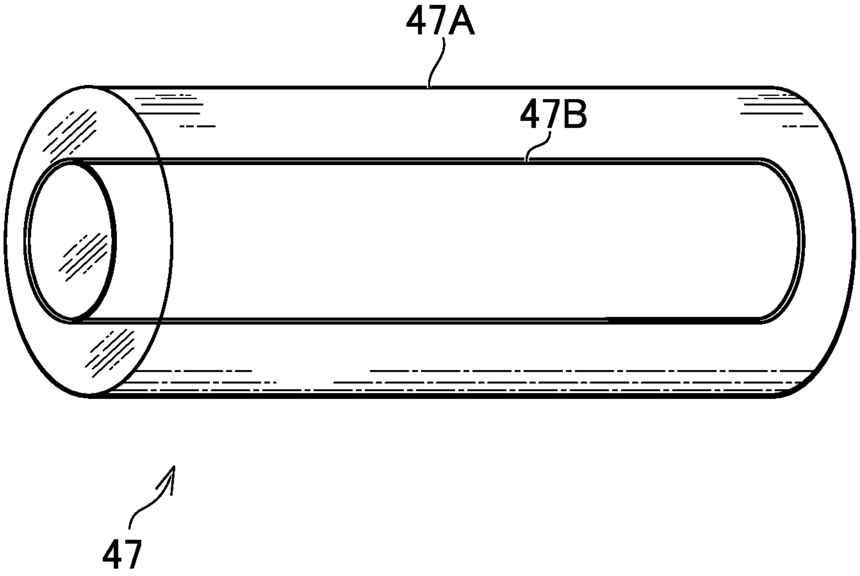
FIG. 8 is a perspective view of a light separating tube according to a modification.

FIG. 8 is a perspective view of a light separating tube 47 according to a modification. The light separating tube 47 shown in FIG. 8 is provided in the rotary joint 40 instead of the light separating tube 42 shown in FIG. 5, and is another example of the light separating portion according to the present invention. The light separating tube 47 includes a translucent cylindrical member 47A preferably made of transparent glass or resin. A columnar member 47B is inserted into the cylindrical member 47A. The columnar member 47B is also made of a translucent, preferably transparent glass or resin material.

Figure 9:
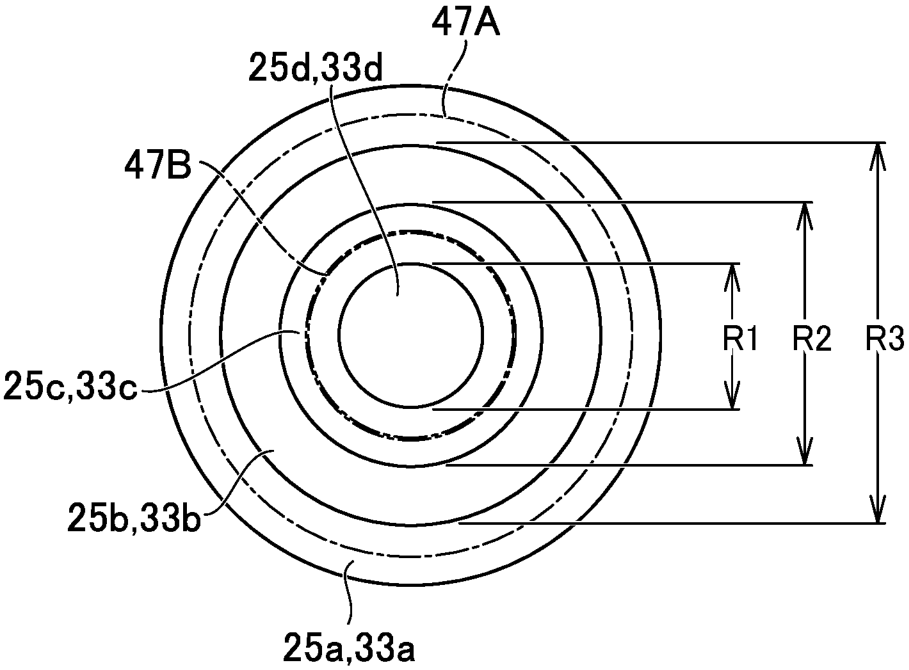
FIG. 9 is a diagram illustrating an arrangement of a body-side fiber holding portion, a probe-side fiber holding portion, and a light separating tube according to the modification.

FIG. 9 is a diagram showing an arrangement of the body-side fiber holding portion 25, the probe-side fiber holding portion 33, and the light separating tube 47. The inner diameter of the columnar member 47B is equal to or larger than the diameter R1 of the circular area 25*d* of the body-side fiber holding portion 25 and the circular area 33*d* of the probe-side fiber holding portion 33. The circular area 25*d* of the body-side fiber holding portion 25 is disposed adjacent to one end of the face of the columnar member 47B, and the circular area 33*d* of the probe-side fiber holding portion 33 is disposed adjacent to the other end of the face. This allows the columnar member 47B to be disposed in the columnar space between the circular areas 25*d* and 33*d.*

The inner diameter of the cylindrical member 47A is equal to or smaller than the inner diameter R2 of the annular area 25*b* of the body-side fiber holding portion 25 and the annular area 33*b* of the probe-side fiber holding portion 33. The outer diameter of the columnar member 47B is equal to or larger than the outer diameter R3 of the annular area 25*b* of the body-side fiber holding portion 25 and the annular area 33*b* of the probe-side fiber holding portion 33. The annular area 25*b* of the body-side fiber holding portion 25 is disposed adjacent to one end of the face of the cylindrical member 47A, and the annular area 33*b* of the probe-side fiber holding portion 33 is disposed adjacent to the other end of the face. This allows the cylindrical member 47A is disposed in the cylindrical space between the annular areas 25*b* and 33*b.*

The inner diameter of the cylindrical member 47A is substantially equal to the diameter of the columnar member 47B, but they are different members, and thus a gap, which is a relatively low refractive air-layer, is inevitably interposed therebetween. As such, in the light separating tube 47 as well, the total reflection of light emitted from the light projection fiber 27 is repeatedly propagated on the inner surface and the outer surface of the cylindrical member 47A, and thus the light can be suitably guided to the light projection fiber 34. Further, the total reflection of light emitted from the light reception fiber 35 is repeatedly propagated on the outer surface of the columnar member 47B, and thus the light can be suitably guided to the light reception fiber 28. That is, the light separating tube 47 can inhibit the light from passing through between the columnar space between the circular areas 25*d* and 33*d* and the cylindrical space between the annular areas 25*b* and 33*b.*

For example, in the above embodiment, a lot of light reception fibers 28 are disposed in the body-side fiber holding portion 25 and a lot of light reception fibers 35 are also disposed in the probe-side fiber holding portion 33, although one light reception fiber may be disposed in each holding portion. Further, in the above embodiment, the light reception channel is provided inside the rotary joint 40 and the light outside, although such projection channel is provided configuration may be reversed. The light separating tube 42 may be integrally provided with the body-side fiber holding portion 25 or the probe-side fiber holding portion 33.

The invention claimed is:

1. A rotary joint comprising:

a first fiber holding portion that holds a plurality of optical fibers included in a first optical cable such that a first end face of a first inner optical fiber included in the first optical cable is disposed in a first circular area and a second end face of a group of first outer optical fibers included in the first optical cable is disposed in a first annular area that is concentric with the first circular area and has an inner diameter larger than a diameter of the first circular area;

a second fiber holding portion that holds a plurality of optical fibers included in a second optical cable such that a first end face of a second inner optical fiber included in the second optical cable is disposed in a second circular area and a second end face of a group of second outer optical fibers included in a second annular area that is concentric with the second circular area and has an inner diameter larger than a diameter of the second circular area;

a rotation support portion that relatively and rotatably supports the first fiber holding portion and the second fiber holding portion such that the first circular area and the second circular area are separated from and opposed to each other and the first annular area and the second annular area are separated from and opposed to each other;

a light separating portion that is provided between the first fiber holding portion and the second fiber holding portion and inhibits passage of light between a columnar space and a cylindrical space, the columnar space being provided between the first circular area and the second circular area, the cylindrical space being provided between the first annular area and the second annular area;

wherein the light separating portion includes:

a first tube member disposed between the columnar space and the cylindrical space, the first tube member having an inner surface and an outer surface formed as mirror surfaces; and a second tube member surrounding the cylindrical space, the second tube member having an inner surface formed as a mirror surface.

2. The rotary joint according to claim 1, wherein the first circular area and the second circular area are coaxially disposed, and the first annular area and the second annular area are coaxially disposed.

3. The rotary joint according to claim 1, wherein the light separating portion includes a first tube member disposed between the columnar space and the cylindrical space.

4. The rotary joint according to claim 1, wherein the light separating portion includes a translucent columnar member disposed in the columnar space and a translucent cylindrical member disposed in the cylindrical space, the columnar member being inserted into the cylindrical space.

5. An optical measurement device comprising the rotary joint including:

a first fiber holding portion that holds a plurality of optical fibers included in a first optical cable such that a first end face of a first inner optical fiber included in the first optical cable is disposed in a first circular area and a second end face of a group of first outer optical fibers included in the first optical cable is disposed in a first annular area that is concentric with the first circular area and has an inner diameter larger than a diameter of the first circular area;

a second fiber holding portion that holds a plurality of optical fibers included in a second optical cable such that a first end face of a second inner optical fiber included in the second optical cable is disposed in a second circular area and a second end face of a group of second outer optical fibers included in a second annular area that is concentric with the second circular area and has an inner diameter larger than a diameter of the second circular area;

a rotation support portion that relatively and rotatably supports the first fiber holding portion and the second fiber holding portion such that the first circular area and the second circular area are separated from and opposed to each other and the first annular area and the second annular area are separated from and opposed to each other;

a light separating portion that is provided between the first fiber holding portion and the second fiber holding portion and inhibits passage of light between a columnar space and a cylindrical space, the columnar space being provided between the first circular area and the second circular area, the cylindrical space being provided between the first annular area and the second annular area;

wherein the light separating portion includes:

a first tube member disposed between the columnar space and the cylindrical space, the first tube member having an inner surface and an outer surface formed as mirror surfaces; and a second tube member surrounding the cylindrical space, the second tube member having an inner surface formed as a mirror surface.

* * * * *